(12) United States Patent
Chae

(10) Patent No.: US 10,810,744 B2
(45) Date of Patent: Oct. 20, 2020

(54) IMAGE PROCESSING DEVICE, IMAGE PROCESSING METHOD AND IMAGE PROCESSING PROGRAM

(71) Applicant: Rakuten, Inc., Tokyo (JP)

(72) Inventor: Yeongnam Chae, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 16/304,523

(22) PCT Filed: May 27, 2016

(86) PCT No.: PCT/JP2016/065771
§ 371 (c)(1),
(2) Date: Nov. 26, 2018

(87) PCT Pub. No.: WO2017/203705
PCT Pub. Date: Nov. 30, 2017

(65) Prior Publication Data
US 2019/0304096 A1   Oct. 3, 2019

(51) Int. Cl.
*G06T 7/11* (2017.01)
*G06K 9/46* (2006.01)
(Continued)

(52) U.S. Cl.
CPC ............. *G06T 7/11* (2017.01); *G06K 9/3241* (2013.01); *G06K 9/46* (2013.01); *G06K 9/4652* (2013.01);
(Continued)

(58) Field of Classification Search
CPC .. G06T 7/11; G06T 7/107; G06T 2207/10024
See application file for complete search history.

(56) References Cited

U.S. PATENT DOCUMENTS 8,494,256 B2 * 7/2013 Aisaka ................. G06T 7/0002
382/156
8,625,859 B2 * 1/2014 Sabe .................. G06K 9/00281
382/118
(Continued)

FOREIGN PATENT DOCUMENTS

EP      1223551 A2     7/2002
WO   2013/160663 A2   10/2013

OTHER PUBLICATIONS

International Preliminary Report on Patentability issued from the International Bureau in counterpart International Application No. PCT/JP2016/065771, dated Dec. 6, 2018.
(Continued)

*Primary Examiner* — Brian P Yenke
(74) *Attorney, Agent, or Firm* — Sughrue Mion, PLLC

(57) ABSTRACT

An image processing device includes an image acquisition means that acquires a target image, which is an image to be processed, an extraction means that extracts a plurality of partial regions from the target image by clustering based on specified color similarity of pixel values, a generation means that generates a plurality of composite images, each of which is composed of one or more partial regions out of the plurality of partial regions, a calculation means that calculates, for each of the composite images, a score indicating a likelihood that a shape formed by the partial region constituting the composite image is a shape of an object to be extracted, and an output means that outputs processing target region information specifying a composite image with the highest score as an object region where the object is shown in the target image.

21 Claims, 14 Drawing Sheets

(51) Int. Cl.
  *G06K 9/32* (2006.01)
  *G06T 7/143* (2017.01)
  *G06T 7/187* (2017.01)
  *G06T 7/194* (2017.01)
  *G06K 9/62* (2006.01)
  *G06T 7/136* (2017.01)

(52) U.S. Cl.
  CPC ............ *G06K 9/6223* (2013.01); *G06T 7/136* (2017.01); *G06T 7/143* (2017.01); *G06T 7/187* (2017.01); *G06T 7/194* (2017.01); *G06T 2207/10024* (2013.01); *G06T 2207/20072* (2013.01); *G06T 2207/20076* (2013.01)

(56) References Cited

U.S. PATENT DOCUMENTS

| | | | | |
|---|---|---|---|---|
| 8,675,957 | B2* | 3/2014 | Goswami | G06T 7/0002 382/162 |
| 8,836,791 | B2* | 9/2014 | Hirano | G06T 7/20 348/157 |
| 8,861,881 | B2* | 10/2014 | Tate | G06T 5/003 345/473 |
| 9,025,876 | B2* | 5/2015 | Schlosser | G06K 9/6267 382/180 |
| 9,036,915 | B2* | 5/2015 | Quan | G06F 16/583 382/190 |
| 9,092,691 | B1* | 7/2015 | Beaumont | G06T 7/0014 |
| 9,129,191 | B2* | 9/2015 | Cohen | G06F 16/7328 |
| 9,229,958 | B2* | 1/2016 | Zhang | G06K 9/00288 |
| 9,292,929 | B2* | 3/2016 | Hayata | G06T 7/11 |
| 9,443,162 | B2* | 9/2016 | Asvatha Narayanan | G06K 9/38 |
| 9,483,704 | B2* | 11/2016 | Schwartz | G06K 9/00201 |
| 9,519,918 | B2* | 12/2016 | Goswami | G06T 7/0002 |
| 9,563,962 | B2* | 2/2017 | Lin | G06K 9/627 |
| 9,667,789 | B2* | 5/2017 | Odinak | H04W 4/12 |
| 9,741,125 | B2* | 8/2017 | Baruch | G06T 7/187 |
| 9,972,092 | B2* | 5/2018 | Lin | G06K 9/66 |
| 10,068,137 | B2* | 9/2018 | Diot | G06K 9/00751 |
| 10,242,295 | B2* | 3/2019 | Jiang | G06K 9/628 |
| 2002/0136449 | A1* | 9/2002 | Park | G06K 9/3241 382/164 |
| 2002/0186875 | A1* | 12/2002 | Burmer | G06K 9/00127 382/133 |
| 2010/0246939 | A1* | 9/2010 | Aisaka | G06T 7/0002 382/156 |
| 2010/0278425 | A1* | 11/2010 | Takemoto | G06T 7/10 382/173 |
| 2011/0091071 | A1* | 4/2011 | Sabe | G06K 9/00281 382/103 |
| 2012/0032960 | A1* | 2/2012 | Kameyama | H04N 7/17318 345/428 |
| 2012/0230583 | A1* | 9/2012 | Inoshita | G06K 9/3233 382/165 |
| 2012/0314932 | A1* | 12/2012 | Nakayama | G06K 9/00362 382/154 |
| 2013/0336582 | A1* | 12/2013 | Dai | G06K 9/4652 382/165 |
| 2014/0133761 | A1* | 5/2014 | Hikida | G06K 9/4604 382/199 |
| 2014/0241625 | A1* | 8/2014 | Suzuki | G06T 7/90 382/164 |
| 2014/0314313 | A1* | 10/2014 | Kennedy | G06K 9/00369 382/165 |
| 2014/0355882 | A1* | 12/2014 | Hayata | G06T 7/11 382/173 |
| 2015/0317511 | A1* | 11/2015 | Li | G06K 9/00288 382/118 |
| 2015/0363660 | A1* | 12/2015 | Vidal | G06F 16/532 382/173 |
| 2016/0042250 | A1 | 2/2016 | Cordova-Diba et al. | |
| 2016/0210513 | A1* | 7/2016 | Wang | G06K 9/00362 |
| 2016/0225053 | A1* | 8/2016 | Romley | G06T 7/11 |
| 2016/0335521 | A1* | 11/2016 | Jiang | G06K 9/628 |
| 2016/0335789 | A1* | 11/2016 | Zhang | G06T 11/60 |
| 2017/0076438 | A1* | 3/2017 | Kottenstette | G06K 9/00637 |
| 2017/0168709 | A1* | 6/2017 | Zhong | G06T 7/11 |
| 2017/0206661 | A1* | 7/2017 | Sasaki | G06F 3/0488 |
| 2017/0228872 | A1* | 8/2017 | An | G06T 7/194 |
| 2017/0352162 | A1* | 12/2017 | Ruan | G06K 9/6215 |
| 2018/0225543 | A1* | 8/2018 | Kobori | G06K 9/00664 |
| 2019/0003827 | A1* | 1/2019 | Chae | G06T 7/60 |
| 2019/0236394 | A1* | 8/2019 | Price | G06K 9/3241 |

OTHER PUBLICATIONS

Carten Rother et al., ""GrabCut"—Interactive Foreground Extraction using Iterated Graph Cuts", SIGGRAPH '04 ACM SIGGRAPH 2004 Papers, URL:http://cvg.ethz.ch/teaching/cvl/2012/grabcut-siggraph04.pdf, Online, Searched on Apr. 20, 2016, p. 309-p. 314.
Kanungo et al., "An Efficient κ-Means Clustering Algorithm: Analysis and Implementation". IEEE Transactions on Pattern Analysis and Machine Intelligence, vol. 24, No. 7, Jul. 2002, pp. 881-892.
Communication dated Oct. 10, 2019, from the European Patent Office in counterpart European Application No. 16903186.1.

* cited by examiner

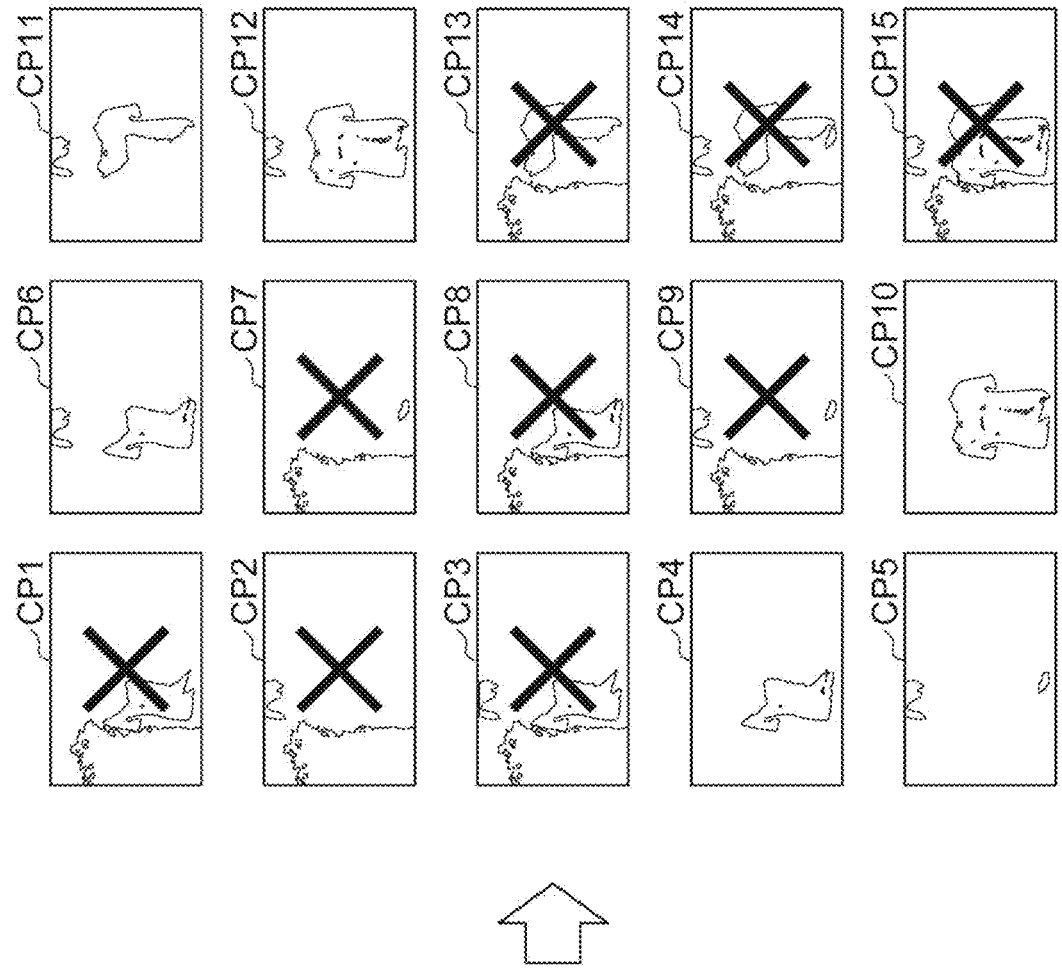
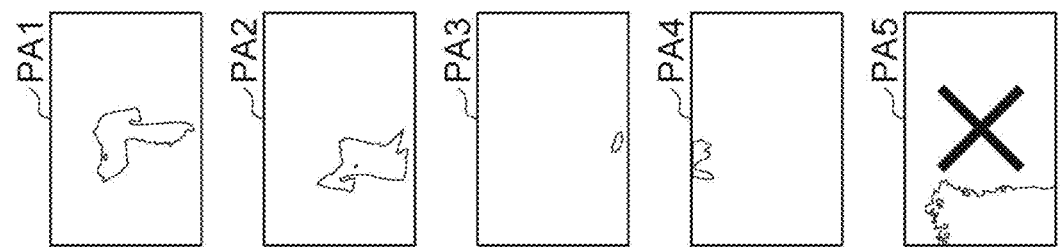
Fig.6

*Fig.10*
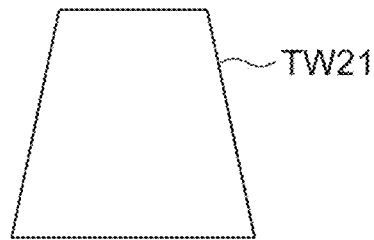
TW21
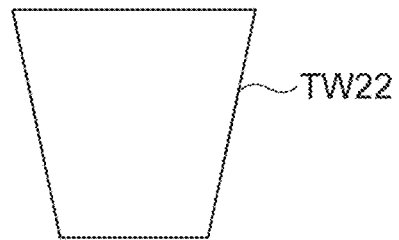
TW22
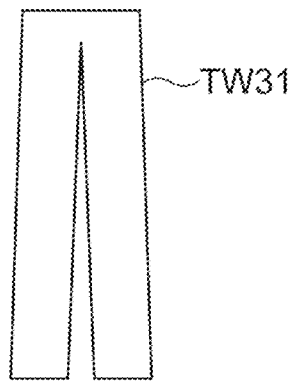
TW31
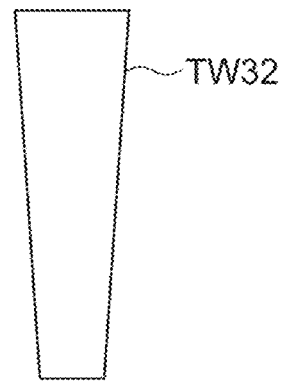
TW32

IMAGE PROCESSING DEVICE, IMAGE PROCESSING METHOD AND IMAGE PROCESSING PROGRAM

CROSS REFERENCE TO RELATED APPLICATIONS

This Application is a National Stage of International Application No. PCT/JP2016/065771 filed May 27, 2016.

TECHNICAL FIELD

The present invention relates to an image processing device, an image processing method, and an image processing program.

BACKGROUND ART

There are techniques to extract a specified object from an image. For example, a technique called GrabCut can extract an object composed of a plurality of colors from an image (see Non Patent Literature 1, for example).

CITATION LIST

Non Patent Literature

NPL1: GrabCut-Interactive Foreground Extraction using Iterated Graph Cuts, SIGGRAPH '04 ACM SIGGRAPH 2004 Papers, Pages 309-314, [online], [Searched on Apr. 20, 2016], Internet <http://cvg.ethz.ch/teaching/cvl/2012/grabcut-siggraph04.pdf>

SUMMARY OF INVENTION

Technical Problem

The technique according to related art described above needs to designate in advance a region where an object to be extracted occupies a large part. Thus, it takes time and effort to designate such a region.

In view of the foregoing, an object of the present invention is to automatically extract, from an image, a region where an object to be extracted occupies a large part.

Solution to Problem

To solve the above problem, an image processing device according to one embodiment of the present invention includes an image acquisition means configured to acquire a target image being an image to be processed, an extraction means configured to extract a plurality of partial regions from the target image by clustering based on specified color similarity of pixel values, a generation means configured to generate a plurality of composite images each composed of one or more partial regions out of the plurality of partial regions, a calculation means configured to calculate, for each of the composite images, a score indicating a likelihood that a shape formed by the partial region constituting the composite image is a shape of an object to be extracted, and an output means configured to output processing target region information specifying a composite image with the highest score as an object region where the object is shown in the target image.

An image processing method according to one embodiment of the present invention is an image processing method in an image processing device, the method including an image acquisition step of acquiring a target image being an image to be processed, an extraction step of extracting a plurality of partial regions from the target image by clustering based on specified color similarity of pixel values, a generation step of generating a plurality of composite images each composed of one or more partial regions out of the plurality of partial regions, a calculation step of calculating, for each of the composite images, a score indicating a likelihood that a shape formed by the partial region constituting the composite image is a shape of an object to be extracted, and an output step of outputting processing target region information specifying a composite image with the highest score as an object region where the object is shown in the target image.

An image processing program according to one embodiment of the present invention causes a computer to function as an image acquisition means configured to acquire a target image being an image to be processed, an extraction means configured to extract a plurality of partial regions from the target image by clustering based on specified color similarity of pixel values, a generation means configured to generate a plurality of composite images each composed of one or more partial regions out of the plurality of partial regions, a calculation means configured to calculate, for each of the composite images, a score indicating a likelihood that a shape formed by the partial region constituting the composite image is a shape of an object to be extracted, and an output means configured to output processing target region information specifying a composite image with the highest score as an object region where the object is shown in the target image.

According to the embodiments described above, partial regions that are likely to constitute a part of an object to be extracted are extracted from a target image by clustering based on color similarity of pixel values, and a plurality of composite images that are likely to form a region occupying a large part of the object are generated by combining one or more partial regions. Then, the likelihood that a shape formed by a partial region included in each composite image is the shape of the object is calculated, and processing target region information that specifies the composite image where the calculated likelihood is highest as an object region where an object is shown is output. It is thereby possible to automatically acquire information about a region that occupies a large part of an object. By performing Grabcut, for example, based on the processing target region information obtained in this manner, it is possible to extract a desired object with high accuracy from a target image.

In the image processing device according to another embodiment, the generation means may refrain from using a partial region located on an outer edge of the target image for generation of the composite images.

According to the above embodiment, because a partial region located on the outer edge of the target image is not used for generation of the composite images in consideration of the fact that an object to be extracted is not likely to be shown on the outer edge of the target image, the composite images including a partial region where the object is not likely to be shown are not generated. The processing load concerning processing of calculating a likelihood that a shape formed by a partial region included in the composite image is the shape of the object is thereby reduced.

In the image processing device according to another embodiment, the generation means may refrain from using a partial region containing pixels with a specified range of pixel values for generation of the composite images.

According to the above embodiment, because a partial region that contains pixels with pixels values which are not likely to be contained in the object to be extracted is not used for generation of the composite images, the composite images including a partial region where the object is not likely to be shown are not generated. The processing load concerning processing of calculating a likelihood that a shape formed by a partial region included in the composite image is the shape of the object is thereby reduced.

In the image processing device according to another embodiment, the specified range of pixel values may be pixel values representing human skin color.

According to the above embodiment, because a partial region that contains pixels with pixel values representing human skin color is not used for generation of the composite images, the composite images including a partial region where a person or a part of a person is shown are not generated. For example, when the target image shows a person who wears an item such as clothing and an object to be extracted is that item, it is possible to prevent generation of composite images including a partial region where the object is not likely to be shown. The processing load concerning processing of calculating a likelihood that a shape formed by a partial region included in the composite image is the shape of the object is thereby reduced.

In the image processing device according to another embodiment, the calculation means may refrain from calculating the score of the composite image when locations of a plurality of partial regions constituting the composite image are separated from each other by a specified distance or more.

According to the above embodiment, in consideration of the fact that an object to be extracted is not likely to be shown in a plurality of regions separated from each other, processing of calculating a likelihood of being the shape of the object is not carried out for the composite image when locations of a plurality of partial regions constituting the composite image are separated from each other by a specified distance or more. The processing load concerning processing of calculating a likelihood that a shape formed by a partial region included in the composite image is the shape of the object is thereby reduced.

The image processing device according to another embodiment may further include an object extraction means configured to extract the object from the target image based on the processing target region information.

According to the above embodiment, because the object is extracted based on the processing target region information that contains information about a region which occupies a large part of the object, it is possible to extract a desired object with high accuracy from the target image.

In the above embodiment, the object extraction means may extract the object by GrabCut method.

According to the above embodiment, because the object is extracted by GrabCut based on the processing target region information that contains information about a region which occupies a large part of the object, it is possible to extract a desired object with high accuracy from the target image.

In the image processing device according to another embodiment, the calculation means may calculate the score based on a degree of matching between a shape of the object stored previously and a shape formed by the partial region.

According to the above embodiment, because the score is calculated based on the degree of matching between a shape formed by a partial region and the shape of the object stored in advance, it is possible to calculate the score that appropriately represents the likelihood of being the shape of the object.

In the image processing device according to another embodiment, when the highest score among the scores of the composite images calculated by the calculation means is a specified value or higher, the output means may output the processing target region information, and when the highest score among the scores of the composite images calculated by the calculation means is lower than a specified value, the output means may determine that an object to be extracted is not shown in the target image and refrain from outputting the processing target region information.

According to the above embodiment, when a composite image having a score of a specified value or higher is not generated, it is determined that the object is not shown in the target image, and the processing target region information is not output. This prevents processing of extracting the object from being performed on the target image that is not likely to show a desired object, for example. On the other hand, because the processing target region information for composite images having a score of a specified value or higher is output, processing of extracting the object is conducted appropriately.

In the above embodiment, the output means may output information notifying that an object to be extracted is not shown in the target image.

According to the above embodiment, it is possible to allow a user to recognize that the object to be extracted is not shown in the target image.

Advantageous Effects of Invention

According to one aspect of the present invention, it is possible to automatically extract, from an image, a region where an object to be extracted occupies a large part.

BRIEF DESCRIPTION OF DRAWINGS

FIG. 6 is a view showing an example of a case of not using a partial region located on the outer edge of a target image for generation of composite images.

FIG. 10 is a view showing another example of a template.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
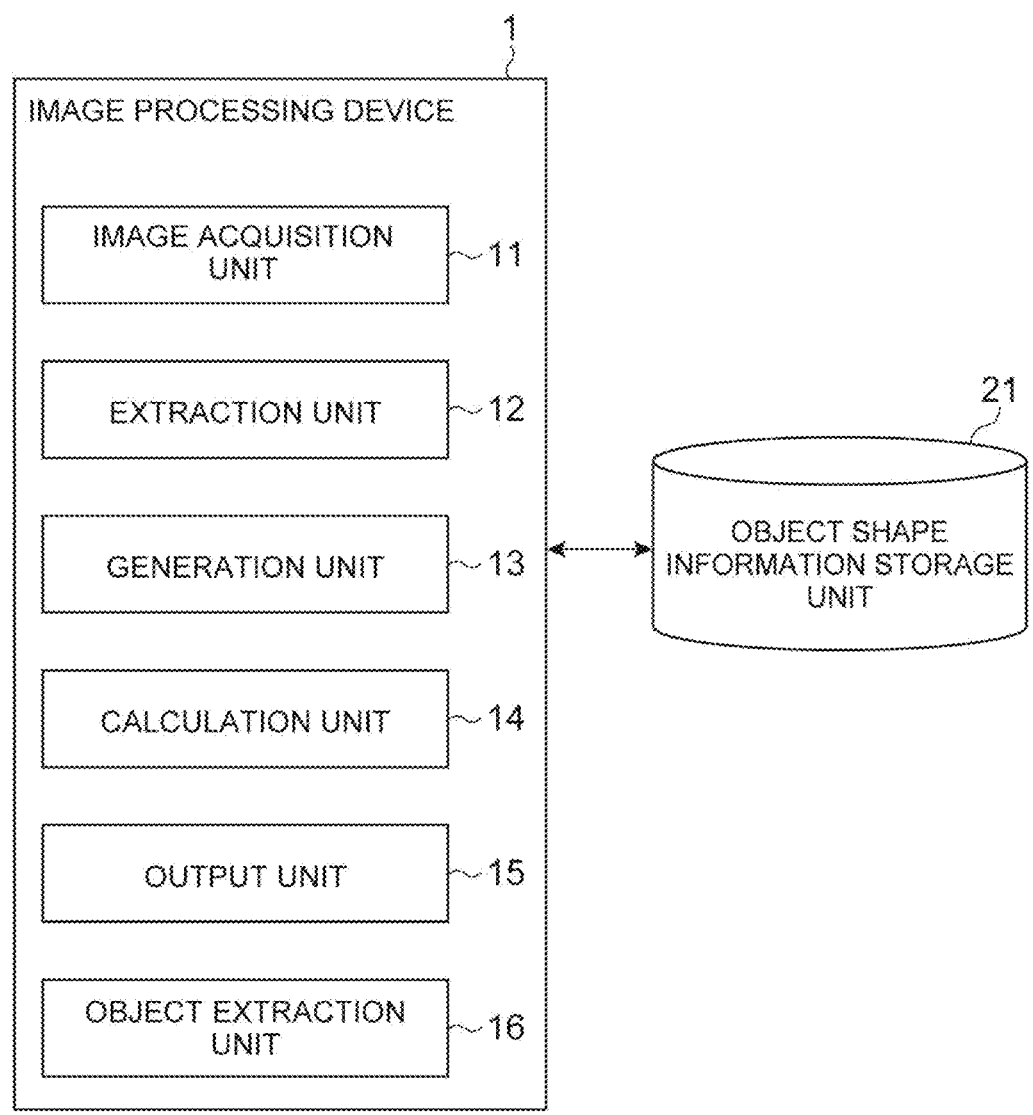
FIG. 1 is a block diagram showing the functional configuration of an image processing device.

FIG. 1 is a block diagram showing the functional configuration of an image processing device 1 according to this embodiment. The image processing device 1 is a device that extracts a desired object from an image, and particularly it automatically extracts a region where an object to be extracted occupies a large part from an image.

An image from which an object is to be extracted is not particularly limited as long as it is an image showing a desired object. In this embodiment, an object to be extracted is clothing, and an image showing clothing is an image to be processed. The image to be processed may be an image showing a person wearing clothing.

Category information is associated with an image to be processed. The category information is information about a category to which an object to be extracted belongs, and it may be "shirt", which is a type of clothing, for example. The image processing device 1 according to this embodiment specifies a region where an object to be extracted is shown from an image to be processed based on the category information, and outputs processing target region information for the specified region. Based on the processing target region information, the object is extracted from the image to be processed by a method called GrabCut, for example. In this embodiment, it is possible to extract an object with high accuracy by using the processing target region information, which is information about a region where an object is shown. Then, processing of more specifically sorting out the category of the extracted object, for example, can be performed. When the extracted object is a shirt, for example, the category such as color, pattern and shape can be sorted out more specifically.

As shown in FIG. 1, the image processing device 1 functionally includes an image acquisition unit 11 (image acquisition means), an extraction unit 12 (extraction means), a generation unit 13 (generation means), a calculation unit 14 (calculation means), an output unit 15 (output means), and an object extraction unit 16 (object extraction means).

Further, the image processing device 1 can access a storage means such as the object shape information storage unit 21. The object shape information storage unit 21 may be included in the image processing device 1 or may be configured as an external storage means that is accessible from the image processing device 1.

Figure 2:
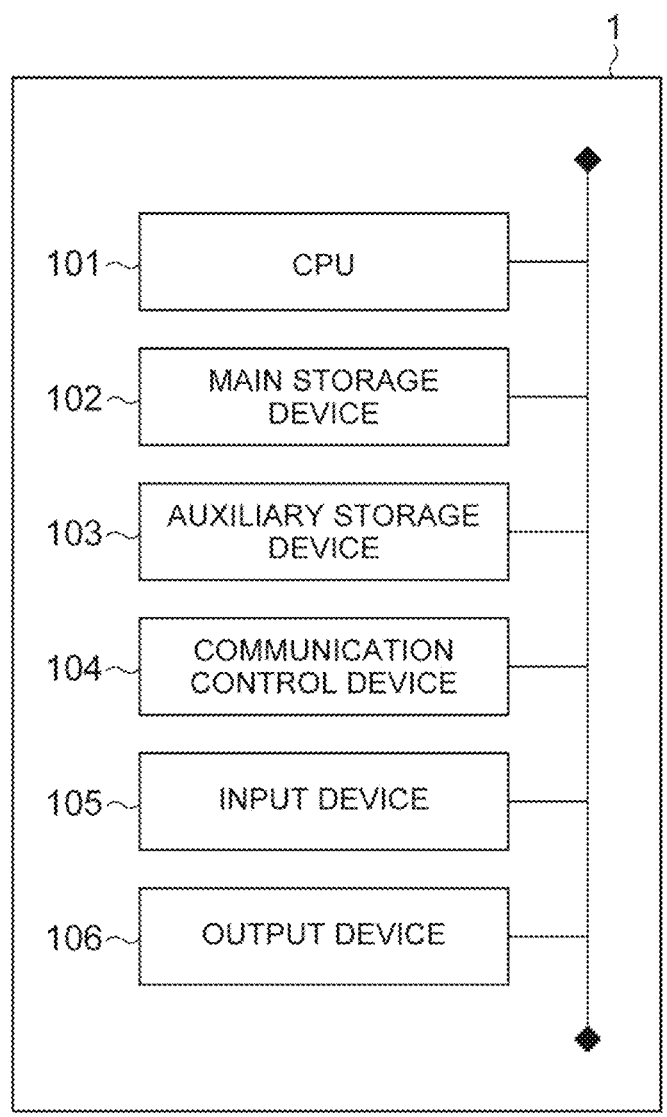
FIG. 2 is a diagram showing the hardware configuration of the image processing device.

FIG. 2 is a hardware configuration diagram of the image processing device 1. As shown in FIG. 2, the image processing device 1 is physically configured as a computer system that includes a CPU 101, a main storage device 102 such as memory like RAM and ROM, an auxiliary storage device 103 such as a hard disk, a communication control device 104 and the like. The image processing device 1 may further include an input device 105 such as a keyboard, a touch panel and a mouse, an output device 106 such as a display and the like.

The functions shown in FIG. 1 are implemented by loading given computer software onto hardware such as the CPU 101 or the main storage device 102 shown in FIG. 2, making the communication control device 104 and the like operate under control of the CPU 101, and performing reading and writing of data in the main storage device 102 or the auxiliary storage device 103. Data and database required for the processing is stored in the main storage device 102 or the auxiliary storage device 103.

Figure 3:
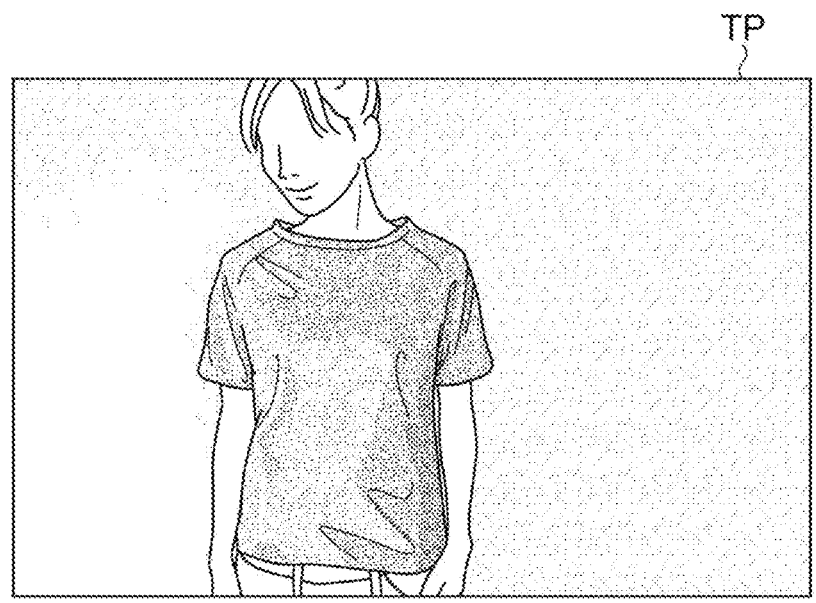
FIG. 3 is a view showing an example of a target image.

The functional units of the image processing device 1 are described hereinafter. The image acquisition unit 11 acquires a target image, which is an image to be processed. FIG. 3 is a view showing an example of a target image. As shown in FIG. 3, a target image TP shows a person wearing clothing, which is an object to be extracted. Although the shirt shown in FIG. 3 has a uniform color, it has parts represented by different colors depending on the way light falls on the shirt. The background wall also has parts represented by different colors depending on the way light falls on the wall.

The extraction unit 12 extracts a plurality of partial regions from a target image. Specifically, the extraction unit 12 extracts a plurality of partial regions by clustering based on specified color similarity of pixel values. The extraction unit 12 performs clustering by K-means, for example. The k-means clustering is a technique that clusters regions having similar colors, and it is a known technique in the technical field of this embodiment.

Figure 4:
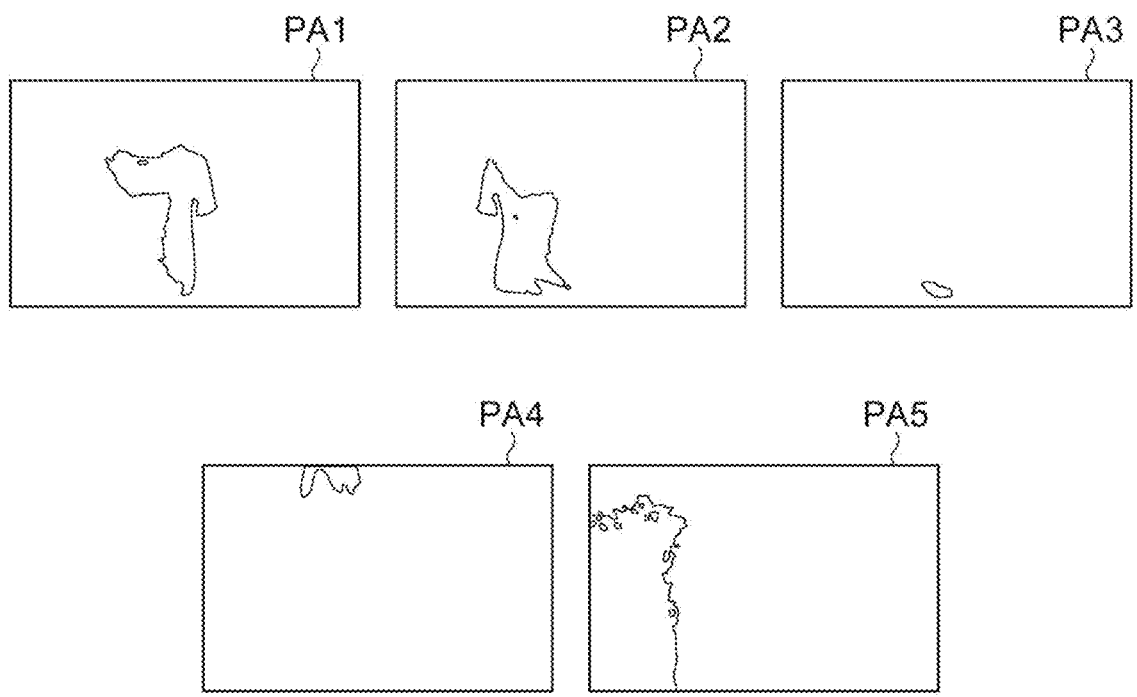
FIG. 4 is a view showing partial regions extracted from a target image.

FIG. 4 is a view showing partial regions PA1 to PA5 extracted from the target image TP. Each of the partial regions PA1 to PA3 corresponds to a part of the shirt, which is an object to be extracted, and they are extracted as different regions having different colors. The partial region PA4 corresponds to a part of the hair of the person wearing the shirt. The partial region PA5 corresponds to a part of the background. Note that the extraction unit 12 may binarize the extracted partial regions PA1 to PA5 as shown in FIG. 4. This reduces the subsequent processing load.

Figure 5:
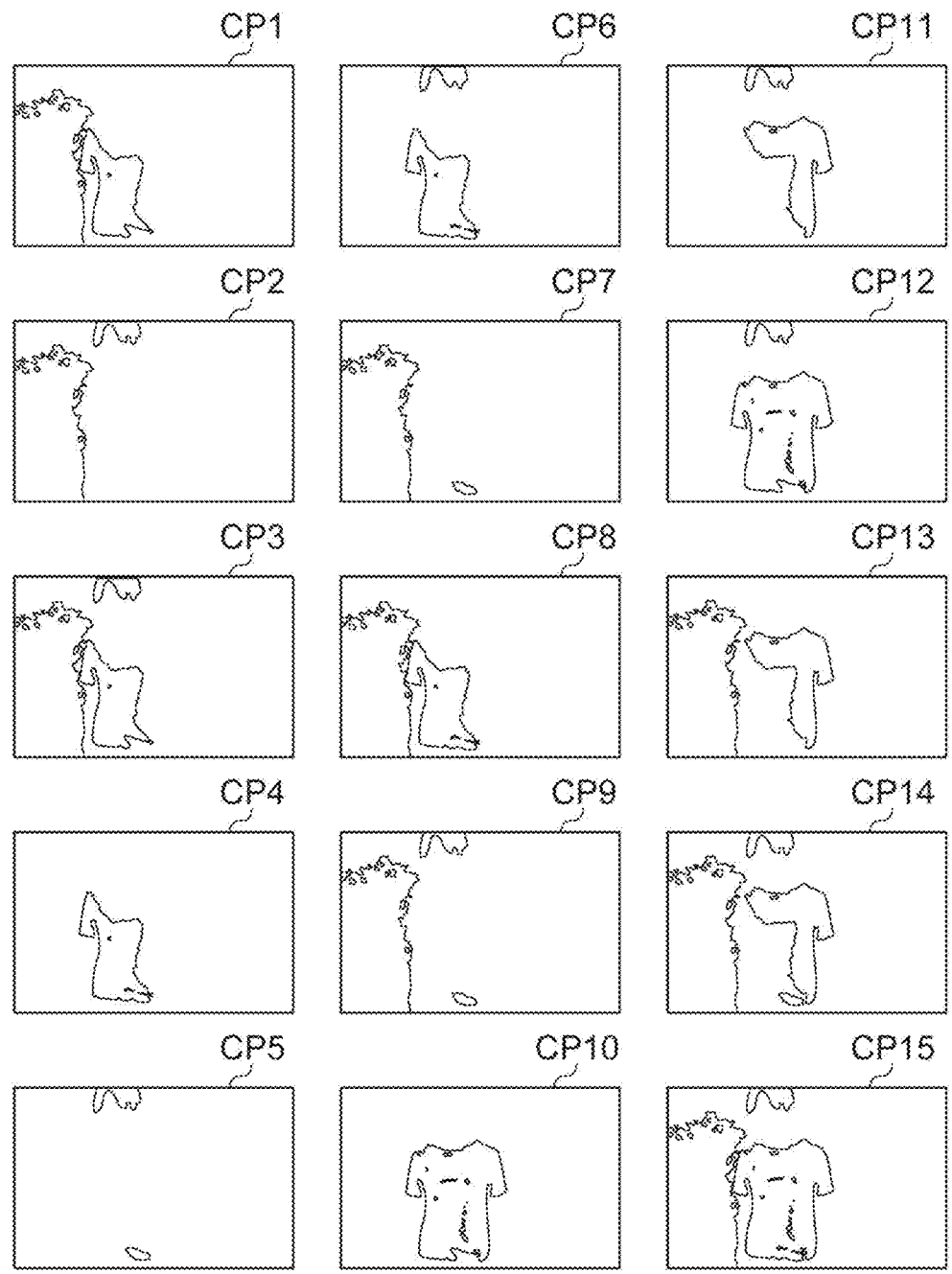
FIG. 5 is a view showing an example of composite images generated by a generation unit.

The generation unit 13 generates a plurality of composite images, each of which combines one or more partial regions out of a plurality of partial regions. FIG. 5 is a view showing an example of composite images generated by the generation unit 13. The generation unit 13 combines one or more partial regions out of the partial regions PA1 to PA5 shown in FIG. 4 and thereby generates composite images CP1 to CP15 as shown in FIG. 5, for example. For example, the generation unit 13 combines the partial region PA2 and the partial region PA5 and thereby generates the composite image CP1.

The generation unit 13 can generate composite images based on all combinations using all of the partial regions extracted by the extraction unit 12. Thus, the number of composite images that can be generated is significantly large, which can cause an increase in the processing load of the calculation unit 14 or the like. In view of this, when it is already known that an object to be extracted is shown near the center of a target image, for example, the generation unit 13 may refrain from using a partial region located on the outer edge of the target image for generation of composite images in consideration of the fact that the object to be extracted is not likely to be shown on the outer edge of the target image.

FIG. 6 is a view showing an example of a case of not using a partial region located on the outer edge of a target image for generation of composite images. As shown in FIG. 6, the generation unit 13 extracts the partial region PA5 that is located on the outer edge of the target image out of the partial regions PA1 to PA5, and determines not to use the partial region PA5 for generation of composite images. The generation unit 13 may determine that a partial region is located on the outer edge of a target image when the length of a contact between the partial region and the outer edge of the target image is a specified value or more or when the ratio of this length to the perimeter of the outer edge is a specified value or more, for example.

As a result that the generation unit 13 determines not to use the partial region PA5 for generation of composite images, the composite images CP1 to CP3, CP7 to CP9 and CP13 to CP15 are not generated. In this manner, a partial region located on the outer edge of a target image is not used for generation of composite images, and it is thereby possible to inhibit generation of composite images that includes a partial region where the object is not likely to be shown. This reduces the processing load concerning the processing of calculating the likelihood that a shape formed by a partial region included in a composite image is the shape of an object to be extracted, which is carried out in the calculation unit 14.

Further, in order to prevent a large number of composite images from being generated, the generation unit 13 may refrain from using a partial region that contains pixels with a specified range of pixel values for generation of composite images. Specifically, when information about the color of an object to be extracted is already known, a partial region that contains pixels with pixels values which are not likely to be contained in the object to be extracted is not used for generation of composite images, and it is thereby possible to prevent generation of composite images including a partial region where the object is not likely to be shown.

Because the object to be extracted is a shirt (clothing) in this embodiment, the generation unit 13 sets the specified range of pixel values to pixel values representing human skin color and can thereby refrain from using a partial region where human skin is shown for generation of composite images. This reduces the processing load concerning the processing of calculating the likelihood that a shape formed by a partial region included in a composite image is the shape of an object to be extracted, which is carried out in the calculation unit 14.

The calculation unit 14 calculates, for each of composite images, the likelihood that a shape formed by a partial region constituting the composite image is the shape of an object to be extracted. Specifically, the calculation unit 14 calculates a score indicating the likelihood of being the shape of an object to be extracted.

Note that, because the processing load for the score calculation is heavy, in order to reduce the number of composite images whose score is to be calculated, the calculation unit 14 may refrain from calculating the score of a composite image when the locations of a plurality of partial regions constituting the composite image are separated from each other by a specified distance or more in consideration of the fact that an object to be extracted is not likely to be shown in a plurality of regions separated from each other in a target image. Prior to describing the score calculation, processing related to extraction of composite images whose score is not to be calculated is described hereinafter.

Figure 7:
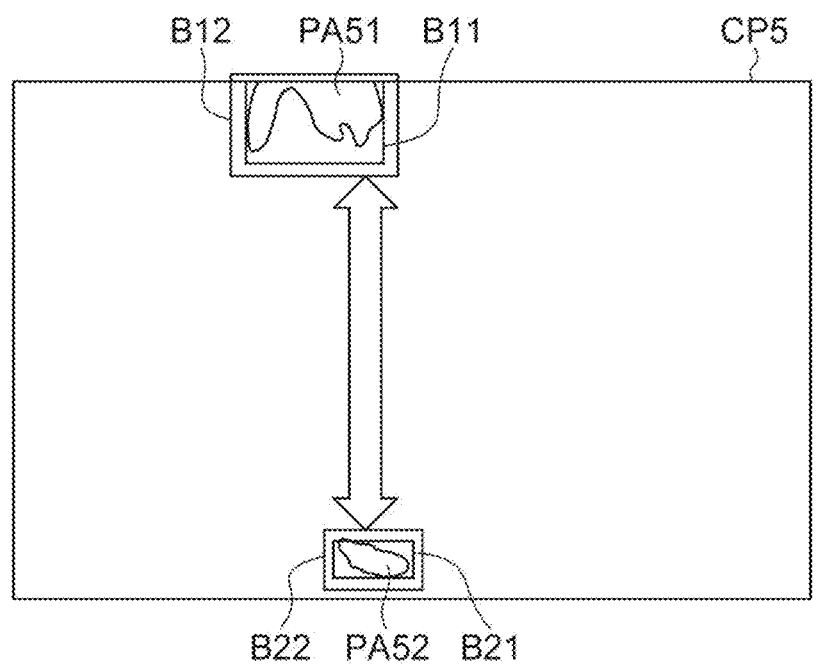
FIG. 7 is a view illustrating an example of processing for determining whether a plurality of partial regions included in a composite image are separated from each other.

FIG. 7 is a view illustrating an example of processing for determining whether a plurality of partial regions included in a composite image are separated from each other. In FIG. 7, determination on the composite image CP5 is shown. First, the calculation unit 14 extracts partial regions PA51 and PA52 that are included in the composite image CP5, and then sets boundary boxes B11 and B21 respectively circumscribing the partial regions PA51 and PA52. Next, the calculation unit 14 enlarges each of the boundary boxes B11 and B21 to a certain degree (for example, 1.1 times) and thereby generates enlarged boundary boxes B12 and B22.

Then, when the enlarged boundary boxes B12 and B22 overlap with each other, the calculation unit 14 determines that the plurality of partial regions included in the composite image are not separated from each other; on the other hand, when the enlarged boundary boxes B12 and B22 do not overlap with each other, the calculation unit 14 determines that the plurality of partial regions included in the composite image are separated from each other. In the example of the composite image CP5 shown in FIG. 7, because the enlarged boundary boxes B12 and B22 do not overlap with each other, the calculation unit 14 determines that the plurality of partial regions included in the composite image CP5 are separated from each other, and it refrains from calculating the score of the composite image CP5.

Figure 8:
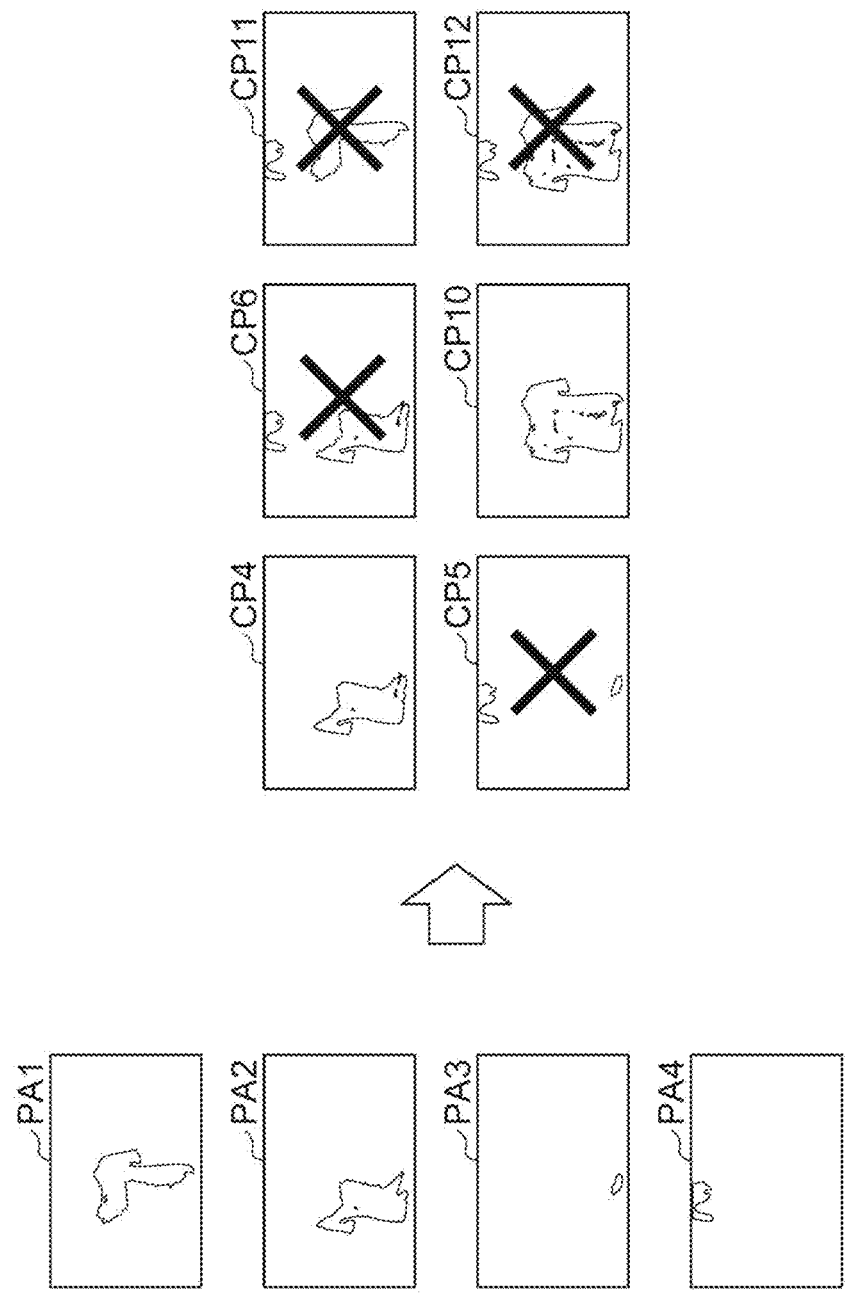
FIG. 8 is a view showing an example of a result of determining whether a plurality of partial regions included in a composite image are separated from each other.

FIG. 8 is a view showing an example of a result of determining whether a plurality of partial regions included in a composite image are separated from each other. In the example shown in FIG. 8, composite images CP4, CP5, CP6, CP10, CP11 and CP12 generated based on partial regions PA1 to PA4 are shown. The calculation unit 14 determines that the plurality of partial regions included in each of the composite images CP5, CP6, CP11 and CP12, among the composite images CP4, CP5, CP6, CP10, CP11 and CP12, are separated from each other by the determination method described with reference to FIG. 7. Then, the calculation unit 14 refrains from calculating the scores of the composite images CP5, CP6, CP11 and CP12.

As described above, when the locations of a plurality of partial regions that constitute a composite image are separated from each other by a specified distance or more, processing of calculating a score indicating the likelihood of being the shape of an object to be extracted is not carried out for this composite image, and therefore the number of composite images subject to the score calculation is reduced, and the processing load for the score calculation processing is thereby reduced.

The calculation of a score indicating the likelihood that a shape formed by a partial region constituting a composite image is the shape of an object to be extracted, which is performed by the calculation unit 14, is described hereinafter. The calculation unit 14 calculates the score of a composite image based on the degree of matching between the shape of an object to be extracted and a shape formed by a partial region. In this embodiment, the calculation unit 14 calculates the score by sliding window method, for example.

The sliding window method is a technique that sets a window of a certain size and performs specified image processing on the area of the set window, and it repeatedly scans the window all over an image to be processed with the window size varying gradually. In this embodiment, the calculation unit 14 performs processing of calculating the degree of matching between the shape of a partial region included in the area of the window that is set in a composite image and the shape of an image to be processed. The calculation unit 14 performs this calculation processing by scanning the window all over the composite image with the window size varying gradually.

Figure 9:
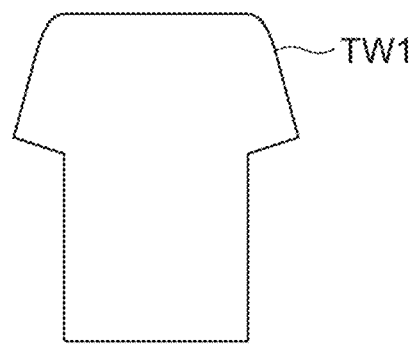
FIG. 9 is a view showing an example of a template representing the shape of an object and stored in an object shape information storage unit.

The shape of an object to be extracted is previously stored in the object shape information storage unit 21 shown in FIG. 1. FIG. 9 is a view showing an example of a template representing the shape of an object, which is stored the object shape information storage unit 21. Because a shirt is extracted as an object to be extracted from a target image in this embodiment, the object shape information storage unit 21 stores a template TW1 representing the shape of a shirt as shown in FIG. 9.

FIG. 10 is a view showing another example of a template. The object shape information storage unit 21 may store templates TW21, TW22, TW31 and TW32 as shown in FIG. 10. The templates TW21 and TW22 are examples of templates to be used when an object to be extracted is a skirt. The templates TW31 and TW32 are examples of templates to be used when an object to be extracted is pants.

Figure 11:
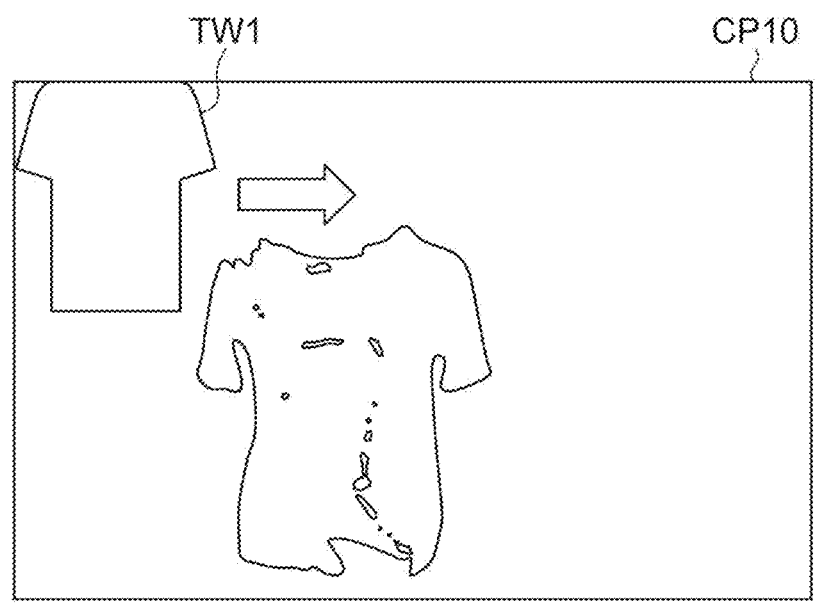
FIG. 11 is a view schematically illustrating score calculation by sliding window method.

FIG. 11 is a view schematically illustrating score calculation by the sliding window method. In the example shown in FIG. 11, the calculation unit 14 calculates the score of a composite image CP10. The calculation unit 14 calculates the score indicating the degree of matching between the shape of the object represented by the template TW1 and the shape of a partial region by scanning the template TW1, which corresponds to the window, all over the composite image CP10.

For example the calculation unit 14 calculates, as the score, the ratio of the number of pixels of a partial region to the total number of pixels contained in the template TW1 in the state where the template TW1 is set at a certain location in the composite image CP10. When the score calculation by running a scan of the template TW1 that is set to a certain size all over the composite image CP10 ends, the calculation unit 14 changes the size of the template TW1 and then runs a scan again. The calculation unit 14 determines the highest score among the scores calculated in this manner as the score of the composite image CP10. The calculation unit 14 then determines the score for all of the generated composite images or composite images to be processed.

In the sliding window method performed in this embodiment, the processing load on the score calculation for a window that is set to a certain size and at a certain location is heavy. Thus, prior to the score calculation, the calculation unit 14 may calculate the number of pixels (effective pixels) of a partial region that are likely to represent an object to be extracted in a set window, and when the ratio of the effective pixels to the pixels of the entire window is smaller than a specified value, the calculation unit 14 may refrain from carrying out the score calculation in this window. For the calculation of effective pixels, a technique called integral image may be used, for example. The integral image is a technique for effectively counting the number of pixels satisfying specified requirements in a certain region, which is known to those skilled in the art.

Figure 12:
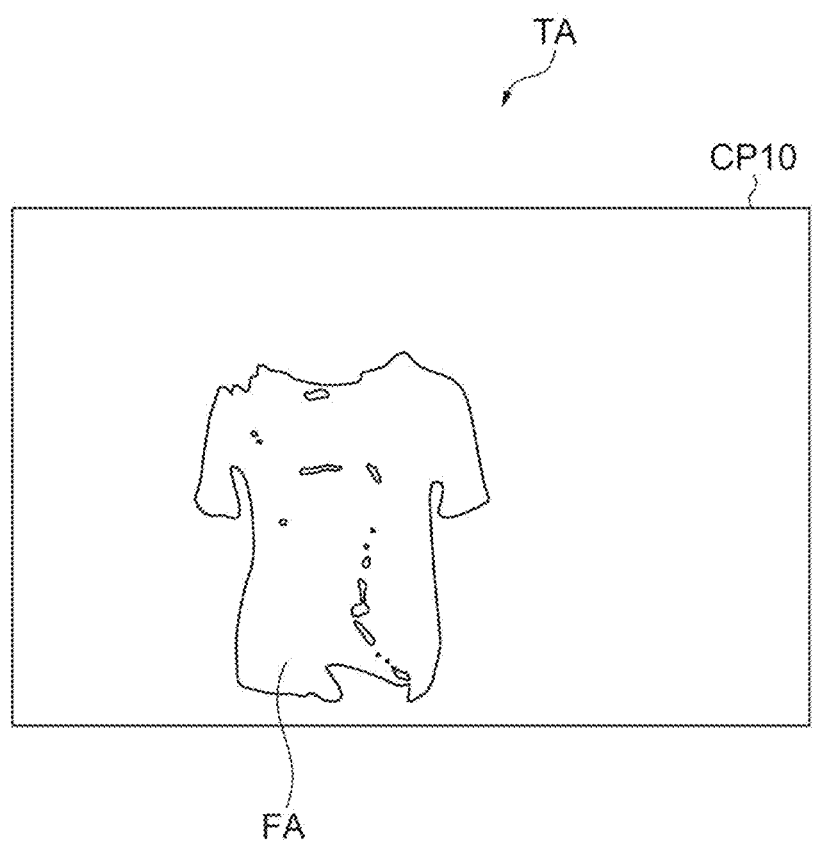
FIG. 12 is a view showing an example of processing target region information.

The output unit 15 outputs processing target region information that specifies the composite image with the highest score as an object region where an object is shown in a target image. Specifically, the output unit 15 outputs the processing target region information that specifies, as the object region, the composite image having the highest score among the scores of the composite images determined by the calculation unit 14. FIG. 12 is a view showing an example of the processing target region information. As shown in FIG. 12, the output unit 15 outputs the composite image CP10 where the score calculated by the calculation unit 14 is highest as an object region FA where a shirt to be extracted is shown.

Note that, when the highest score among the scores of the composite images calculated by the calculation unit 14 is a specified value or higher, the output unit 15 may output the processing target region information; on the other hand, when the highest score among the scores of the composite images calculated by the calculation unit 14 is lower than a specified value, the output unit 15 may determine that an object to be extracted is not shown in a target image, and refrain from outputting the processing target region information. This prevents processing of extracting an object from being carried out on a target image that is not likely to show a desired object. Further, in such a case, the output unit 15 may output information notifying that an object to be extracted is not shown in a target image. This allows a user to recognize that an object to be extracted is not shown in a target image. Further, because the processing target region information for the composite images with the score of a specified value or higher are output, processing of extracting an object is conducted appropriately.

The object extraction unit 16 extracts an object from a target image based on the processing target region information. Specifically, the object extraction unit 16 extracts an object, which is a shirt, from the target image TP shown in FIG. 3 based on the processing target region information TA shown in FIG. 12. The object extraction unit 16 may extract an object by GrabCut method, for example. The GrabCut method is a technique to extract an object from an image, which is known to those skilled in the art.

Figure 13:
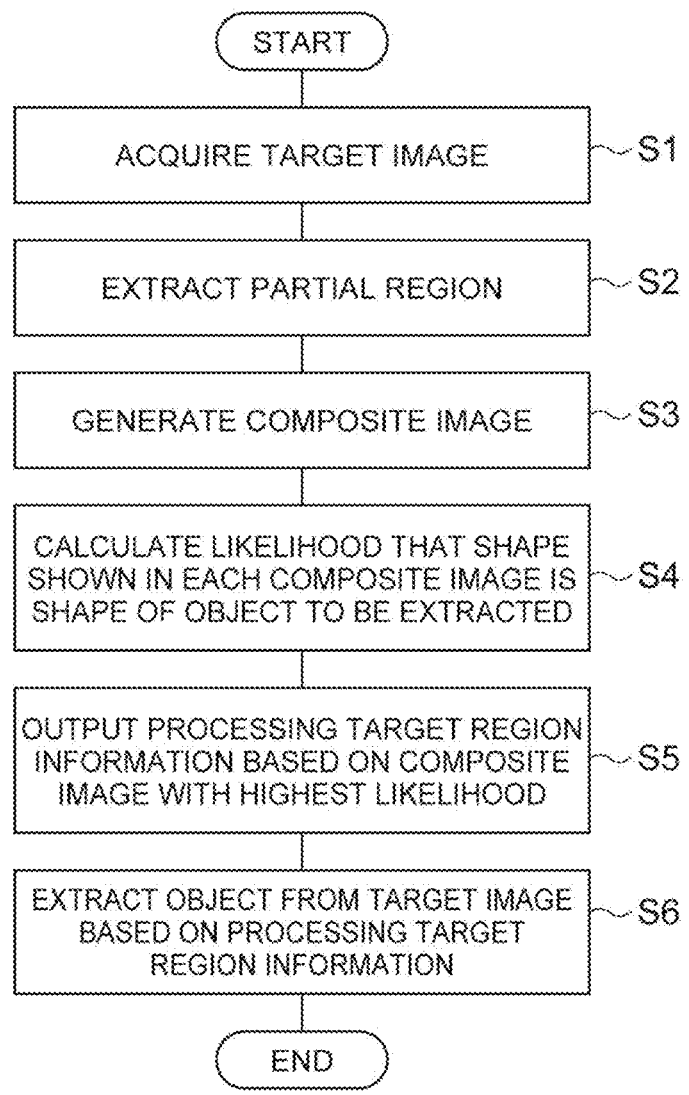
FIG. 13 is a flowchart showing a process of an image processing method performed in the image processing device.

The operation of the image processing device 1 according to this embodiment is described hereinafter with reference to FIG. 13. FIG. 13 is a flowchart showing a process of an image processing method performed in the image processing device 1.

First, the image acquisition unit 11 acquires a target image TP, which is an image to be processed (S1). As shown in FIG. 3, in some embodiments, TP is a still, single frame, image. Next, the extraction unit 12 extracts a plurality of partial regions from the target image TP by clustering based on specified similarity of pixel values related to color (S2).

Then, the generation unit 13 generates composite images composed of one or more partial regions out of a plurality of partial regions (S3). The calculation unit 14 then calculates, for each of the composite images, the likelihood that a shape formed by a partial region constituting the composite image is the shape of an object to be extracted (S4).

The output unit 15 then outputs processing target region information that specifies the composite image with the highest likelihood as an object region where the object is shown in the target image (S5).

After that, the object extraction unit 16 extracts the object from the target image TP based on the processing target region information output in Step S5 (S6).

Figure 14:
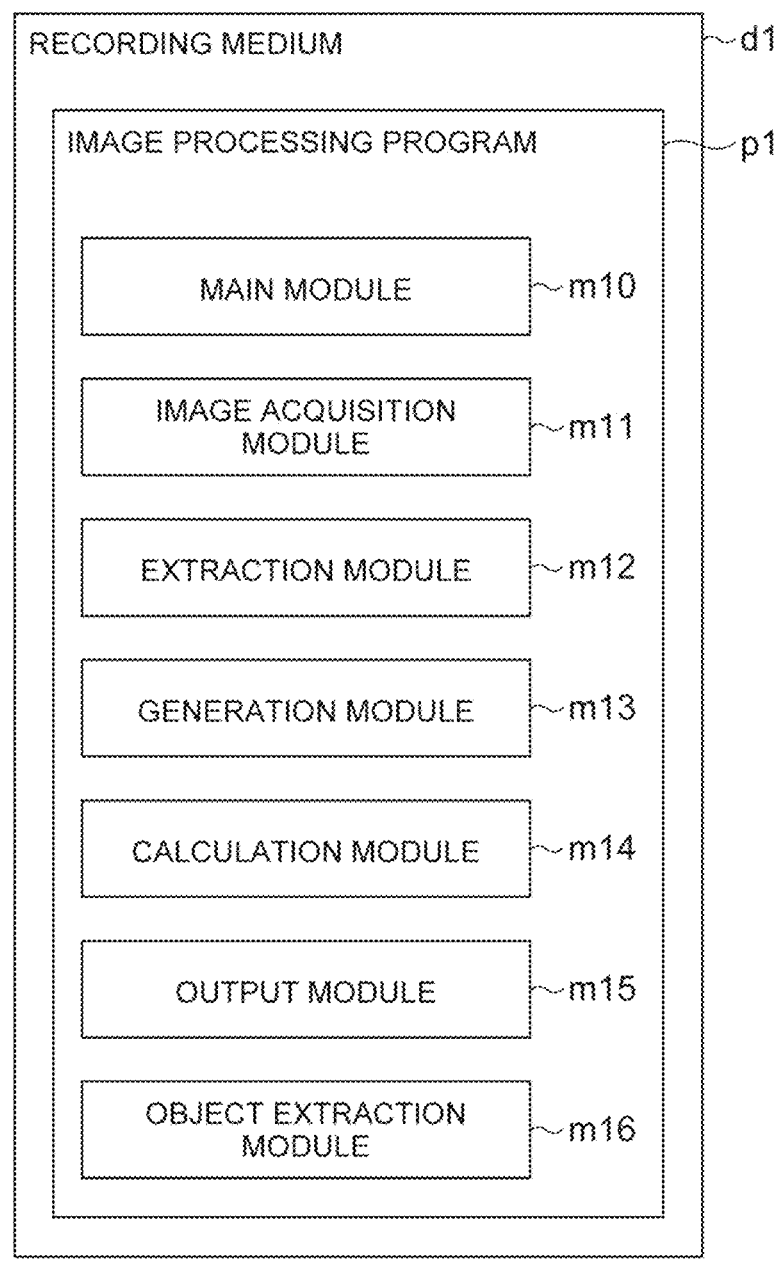
FIG. 14 is a view showing the configuration of an image processing program.

An image processing program that causes a computer to function as the image processing device 1 is described hereinafter with reference to FIG. 14. An image processing program p1 includes a main module m10, an image acquisition module m11, an extraction module m12, a generation module m13, a calculation module m14, an output module m15 and an object extraction module m16.

The main module m10 is a part that exercises control over the image processing. The functions implemented by executing the image acquisition module m11, the extraction module m12, the generation module m13, the calculation module m14, the output module m15 and the object extraction module m16 are respectively equal to the functions of the image acquisition unit 11, the extraction unit 12, the generation unit 13, the calculation unit 14, the output unit 15 and the object extraction unit 16 of the image processing device 1 shown in FIG. 1.

The image processing program p1 is provided by a non-transitory storage medium d1 such as a magnetic disk, an optical disk or semiconductor memory, for example. Further, the image processing program p1 may be provided as a computer data signal superimposed onto a carrier wave through a communication network.

In the image processing device 1, the image processing method and the image processing program p1 according to the embodiment described above, partial regions that are likely to constitute a part of an object to be extracted are extracted from a target image by clustering based on color similarity of pixel values, and a plurality of composite images that are likely to form a region occupying a large part of the object are generated by combining one or more partial regions. Then, the likelihood that a shape formed by a partial region included in each composite image is the shape of the object is calculated, and processing target region information that specifies the composite image where the calculated likelihood is highest as an object region where an object is shown is output. It is thereby possible to automatically acquire information about a region that occupies a large part of an object. By performing Grabcut, for example, based on the processing target region information obtained in this manner, it is possible to extract a desired object with high accuracy from a target image.

An embodiment of the present invention is described in detail above. However, the present invention is not limited to the above-described embodiment. Various changes and modifications may be made to the present invention without departing from the scope of the invention.

REFERENCE SIGNS LIST

1 . . . image processing device, 11 . . . image acquisition unit, 12 . . . extraction unit, 13 . . . generation unit, 14 . . . calculation unit, 15 . . . output unit, 16 . . . object extraction unit, 21 . . . object shape information storage unit, d1 . . . storage medium, m10 . . . main module, m11 . . . image acquisition module, m12 . . . extraction module, m13 . . . generation module, m14 . . . calculation module, m15 . . . output module, m16 . . . object extraction module, p1 . . . image processing program

The invention claimed is:

1. An image processing device comprising:
   at least one memory configured to store computer program code;
   at least one processor configured to access said computer program code and perform, based on said computer program code, operations including:
   acquiring a target image being an image to be processed, wherein the target image corresponds to a still image;
   extracting a first plurality of partial regions from the target image by clustering based on specified color similarity of pixel values, wherein, for any first partial region and second partial region of the first plurality of partial regions, the first partial region is different from the second partial region, wherein the any first partial region and second partial region are different in that they correspond to mutually exclusive regions;
   automatically generating a plurality of composite images each composed of one or more partial regions out of the first plurality of partial regions, wherein at least one of the plurality of composite images is composed of two or more partial regions;
   calculating, for each of the composite images, a score indicating a likelihood that a shape formed by a second plurality of partial regions constituting the composite image is a shape of an object to be extracted, wherein the first plurality of partial regions includes the second plurality of partial regions; and
   outputting processing target region information specifying a composite image with the highest score as an object region where the object is shown in the target image.

2. The image processing device according to claim 1, wherein
   at least one of said at least one processor is configured to not use, for generation of the composite images, a partial region located on an outer edge of the target image.

3. The image processing device according to claim 1, wherein at least one of said at least one processor is configured to not use, for generation of the composite images, a partial region containing pixels with a specified range of pixel values.

4. The image processing device according to claim 3, wherein
   the specified range of pixel values are pixel values representing human skin color.

5. The image processing device according to claim 1, wherein at least one of said at least one processor is configured to not calculate the score of the composite image when locations of the second plurality of partial regions constituting the composite image are separated from each other by a specified distance or more.

6. The image processing device according to claim 1, wherein the operations further include extracting the object from the target image based on the processing target region information.

7. The image processing device according to claim 6, wherein the operations further include extracting the object by a GrabCut method.

8. The image processing device according to claim 1, wherein the operations further include calculating the score based on a degree of matching between a shape of the object stored previously and a shape formed by the second plurality of partial regions.

9. The image processing device according to claim 1, wherein the operations further include outputting, only when the highest score among the scores of the composite images calculated is a specified value or higher, the processing target region information.

10. An image processing method in an image processing device, the method performed by at least one computer processor, comprising:
    acquiring a target image being an image to be processed, wherein the target image corresponds to a still image;
    extracting a first plurality of partial regions from the target image by clustering based on specified color similarity of pixel values, wherein, for any first partial region and second partial region of the first plurality of partial regions, the first partial region is different from the second partial region, wherein the any first partial region and second partial region are different in that they correspond to mutually exclusive regions;
    automatically generating a plurality of composite images each composed of one or more partial regions out of the first plurality of partial regions, wherein at least one of the plurality of composite images is composed of two or more partial regions;
    calculating, for each of the composite images, a score indicating a likelihood that a shape formed by a second plurality of partial regions constituting the composite image is a shape of an object to be extracted, wherein the first plurality of partial regions includes the second plurality of partial regions; and outputting processing target region information specifying a composite image with the highest score as an object region where the object is shown in the target image.

11. The image processing method according to claim 10, wherein the generating comprises using, for generation of the composite images, a partial region located on an outer edge of the target image.

12. The image processing method according to claim 10, wherein the generating comprises not using, for generation of the composite images, a partial region containing pixels with a specified range of pixel values.

13. The image processing method according to claim 12, wherein
the specified range of pixel values are pixel values representing human skin color.

14. The image processing method according to claim 10, wherein the calculating comprises not calculating the score of the composite image when locations the second plurality of partial regions constituting the composite image are separated from each other by a specified distance or more.

15. The image processing method according to claim 10, further comprising:
extracting the object from the target image based on the processing target region information.

16. The image processing method according to claim 15, wherein the extracting further comprises extracting the object by GrabCut method.

17. The image processing method according to claim 10, wherein the calculating comprises calculating the score based on a degree of matching between a shape of the object stored previously and a shape formed by the partial region.

18. The image processing method according to claim 10, wherein the outputting further comprises:
only outputting the processing target region information when the highest score among the scores of the composite images calculated is a specified value or higher.

19. The image processing method according to claim 10, wherein the extracting uses a GrabCut method;
wherein the extracting, the automatically generating, and the calculating are configured to perform a search of possible object indicated in the target image using a combine and match methodology without a manual entry of a region of interest, and
wherein the calculating a score applies a template over a composite image made up of at least two partial regions.

20. A non-transitory computer-readable recording medium storing an image processing program causing a computer to:
acquire a target image being an image to be processed, wherein the target image corresponds to a still image;
extract a first plurality of partial regions from the target image by clustering based on specified color similarity of pixel values, wherein, for any first partial region and second partial region of the first plurality of partial regions, the first partial region is different from the second partial region, wherein the any first partial region and second partial region are different in that they correspond to mutually exclusive regions;
automatically generate a plurality of composite images each composed of one or more partial regions out of the first plurality of partial regions, wherein at least one of the plurality of composite images is composed of two or more partial regions;
calculate, for each of the composite images, a score indicating a likelihood that a shape formed by a second plurality of partial regions constituting the composite image is a shape of an object to be extracted, wherein the first plurality of partial regions includes the second plurality of partial regions; and
output processing target region information specifying a composite image with the highest score as an object region where the object is shown in the target image.

21. An image processing device comprising:
at least one memory configured to store computer program code; and
at least one processor configured to access said computer program code and perform, based on said computer program code, operations including:
acquiring a target image being an image to be processed, wherein the target image corresponds to a still image;
extracting, using a GrabCut method, a first plurality of partial regions from the target image by clustering based on specified color similarity of pixel values, wherein, for any first partial region and second partial region of the first plurality of partial regions, the first partial region is different from the second partial region, wherein the any first partial region and second partial region are different in that they correspond to mutually exclusive regions;
automatically generating a plurality of composite images each composed of one or more partial regions out of the first plurality of partial regions, wherein at least one of the plurality of composite images is composed of two or more partial regions;
calculating, for each of the composite images, a score indicating a likelihood that a shape formed by a second plurality of partial regions constituting the composite image is a shape of an object to be extracted, wherein the first plurality of partial regions includes the second plurality of partial regions, wherein the calculating a score applies a template over a composite image made up of at least two partial regions; and
outputting processing target region information specifying a composite image with the highest score as an object region where the object is shown in the target image,
wherein the extracting, the automatically generating, and the calculating are configured to perform a search of possible object indicated in the target image using a combine and match methodology without a manual entry of a region of interest.

* * * * *